United States Patent Office 3,719,122
Patented Mar. 6, 1973

3,719,122
CONTROL MEANS AND A METHOD OF CONTROLLING THEREBY
John Maximilian Jules Varga, Brighouse, England, assignor to Carding Specialists (Canada) Limited
Continuation-in-part of application Ser. No. 887,388, Dec. 22, 1969. This application Oct. 22, 1971, Ser. No. 191,807
Int. Cl. F15b *21/02;* G05b *19/10;* B23q *35/00*
U.S. Cl. 91—37                                31 Claims

ABSTRACT OF THE DISCLOSURE

A control means for a machine including a pre-recorded programme containing element in, for example, magnetic tape form, and at least one movable scanning head located adjacent the element and connected to a part of the machine to be moved in accordance with the programme, there being on the programme containing element or associated with it a reference signal containing element arranged to be scanned by an additional head so that signals from the scanning heads may be passed to a comparator to enable the moving part to be stopped, reversed and otherwise controlled and for corrections to be made in the manner in which the machine part is moved.

---

This application is a continuation-in-part of my co-pending application, Ser. No. 887,388, filed Dec. 22, 1969 and entitled "Improvements In or Relating to Control Means and a Method of Controlling Thereby."

This invention concerns control means for a machine of the kind having at least one movable member which needs to be moved in accordance with a predetermined programme, for example, a member of a machine tool which is adapted to carry a cutting tool into engagement with a workpiece or vice versa or for a mechanical hand of a work handling machine.

By the term "pre-determined programme" is meant the compilation of information in coded form which will, when sensed by a pick up device, control the future movement of a movable element and periodically will indicate whether or not the sequence of movements of the movable element is being carried out at the requisite time, speed and accuracy.

According to the present invention there is provided a method of controlling a machine having at least one movable member to be moved in accordance with a pre-determined programme, including the steps of providing a surface adapted to have recorded thereon programme information, for example, of magnetic or optical waveform type, arranging a pick up head adjacent said head to sense said information, causing, during a programme cycle motion of said surface relative to said pick up head, causing movement of said movable member in response to a signal emitted by said pick up head, moving said pick up head in accordance with said movement of the movable member, and causing said surface and said pick up head to move concurrently.

According to the present invention there is provided control means for a machine having at least one movable member to be moved in accordance with a pre-determined programme, including a surface adapted to have recorded thereon programme information, for example of magnetic or optical waveform type, a pick up head adapted to sense said information, means for causing, during a programme cycle, motion of said surface relative to said pick up head, means for causing movement, in accordance with said programme, of said movable member in response to a signal emitted by said pick up head, said pick up head being movable in accordance with said movement of the movable member said surface and said pick up head being movable concurrently.

An embodiment of the invention and modifications thereof will now be described further by way of example only, with reference to the accompanying drawings, in which.

In the drawings, like features and components have been given like reference numerals.

Figure 1:
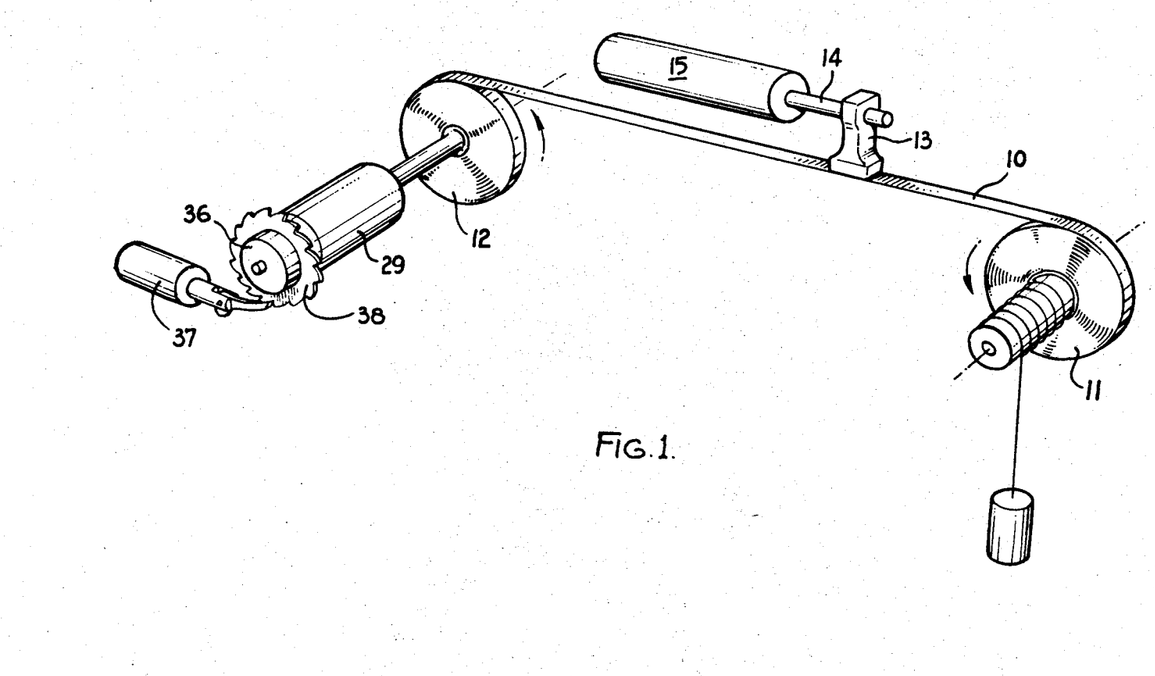
FIG. 1 is a schematic perspective view of a tape drive means.
Figure 2:
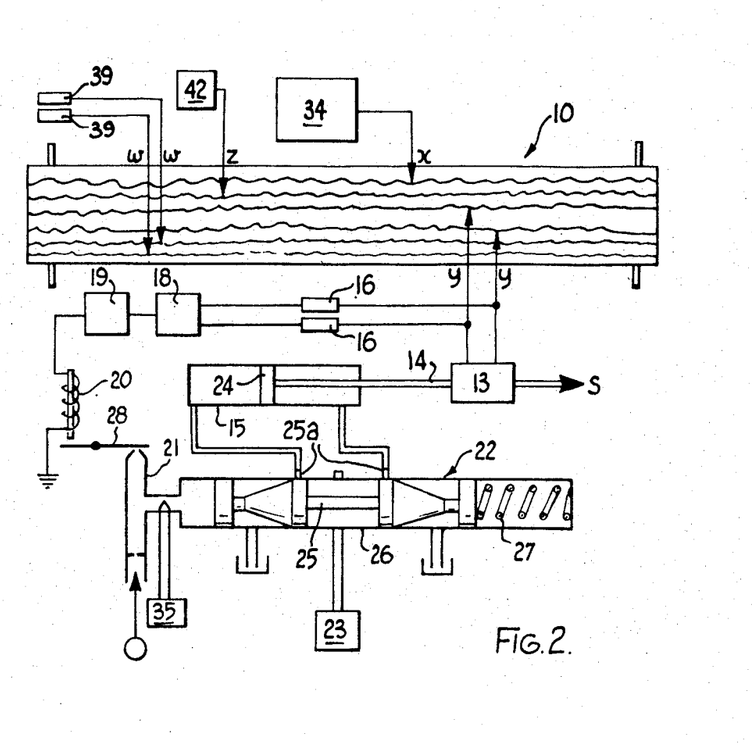
FIG. 2 is a schematic diagram of one embodiment of the invention.

Control means, made in accordance with the invention, comprises a magnetic tape 10 adapted to be transferred from a delivery spool 11 to a take up spool 12, and to be recorded with two magnetic waveforms at least one of which is to be wavelength modulated and one or more reference waveforms, the latter, as will be described, being adapted periodically to check the timing of a work cycle. The two spools are separated so that there is a length of substantially taut tape between them. A movable pickup head 13 having two magnetic pick ups $y$ included therein is arranged to move along in contact with the part of the tape between the spools 11 and 12 and to sense the two magnetic waveforms and is preferably attached either directly or via suitable linkage to the ram 14 of a hydraulic cylinder 15, the latter being adapted to control movement of a movable member $s$ in accordance with a signal emitted from the pick up head 13. The limits of movement of the pickup head 13 are such that the latter always remains on the straight part of the tape 10.

Figure 3:
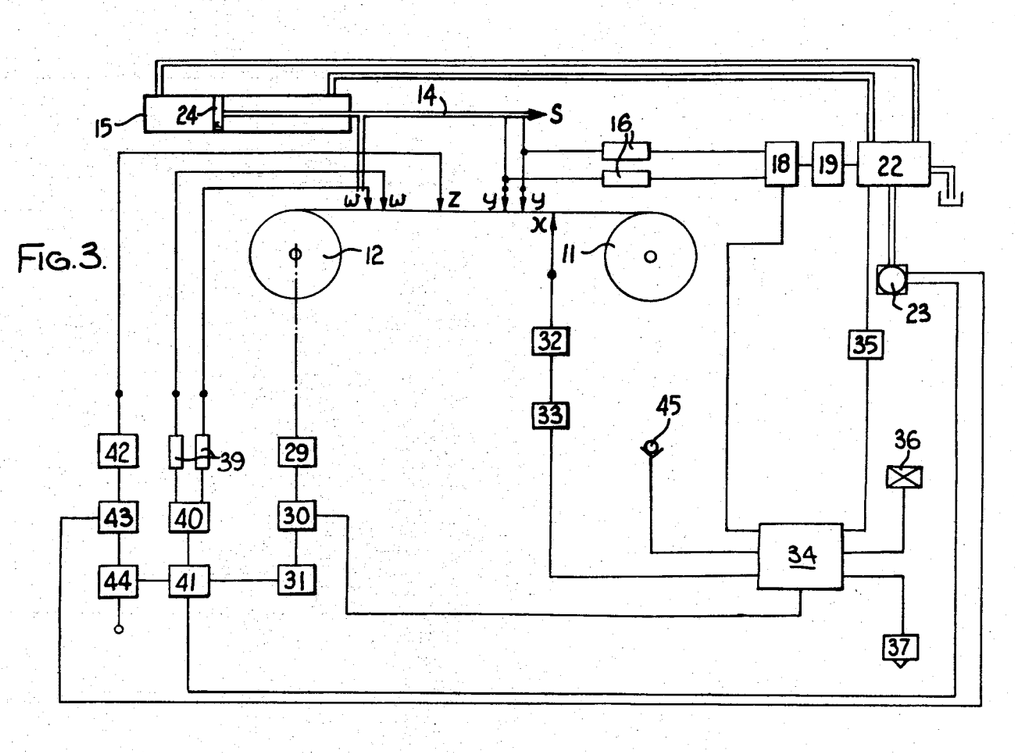
FIG. 3 is a block circuit diagram of the embodiment shown in FIG. 2.

The tape 10 is driven at a constant speed in one direction by means of an electric motor 29 via a switch 30 and a speed control amplifier 31. The speed of the tape 10 is greater than the maximum speed of the pick up head 13 when the latter is moving in the same direction as the tape.

Another pick up head, which has only one pick up $x$, is fixed relative to the apparatus and bears against the tape over the position of the reference waveform. The signal from the pick up $x$ is fed to a frequency-to-voltage converter 32, from which a resultant D.C. voltage is fed via an amplifier 33 to a logic circuit box 34 whose function is to be described.

As the tape 10 is driven past the pick up head 13, the pick ups $y$ sense two wavelength modulated signals which are fed to frequency-to-voltage converters 16. The output from the converters 16 in the form of two D.C. voltages are fed to a switch 17 and then to a comparator 18, from which a single D.C. signal, derived from and proportional to the ratio of the frequences of the wavelength modulated signals, is fed to a servo amplifier 19 and a coil 20 operating a hydraulic transducer 21. The latter controls the operation of a valve 22 fed by a pump 23 and whose outputs are connected to the hydraulic cylinder 15 to control the speed and direction of movement of its piston 24 and thus of the movable member $s$. The hydraulic transducer 21 and the valve 22 together form a servo valve unit.

The valve 22 comprises a valve member 25 slidable in a casing 26 and normally urged in one direction by a spring 27. The speed and direction of movement of the valve member 25 is controlled by the operating arm 28 of the transducer 21. The valve member 25 has flat portions 25a which provide an overlap dwell upon each change of direction of the piston 24. This compensates for any signal error on the tape 10 and any fault in the hydraulic system or change in viscosity of the hydraulic fluid.

Servo amplifier 19 and the valve 22 are connected to the logic circuit box 34, the valve 22 being so connected via a freeze valve actuator 35 to be described.

To record a programme onto the tape, signal generating means (not shown) are provided such that two frequencies are fed into the two pick ups $y$ of the moving head 13, the ratio of whose frequencies is always proportional to the speed of the movable member $s$. If the tape 10 is set into motion and the movable member $s$ is moved through any series of motions, the moving head 13 moves up and down the moving tape and records on it magnetic waveform signals such that it records exactly the speed and direction of motion of the moving head 13. Meanwhile, the fixed pick up $x$ records, for example, a constant frequency signal. If now the tape 10 and the moving head 13 are both returned to their starting positions and the tape started up, whilst the pick ups $x$ and $y$ are set for playback, then obviously if its were possible to produce a perfect machine and the signal were absolutely exact, then the movable member $s$ will reproduce the exact programme which had been performed upon it. Recording of the programme can be carried out independently by other recording means, i.e. the tape can be pre-recorded either at the speed at which it is to be played back or in fact at any other speed that may be found to be convenient.

If the signal and the speed responses to it are not exact, which in fact is likely due to the inability to produce a perfect machine, then during replay, as the programme progresses, the greater will become the error between the position of the moving member $s$ as it actually is and as it was intended to be. To overcome this inherent drift, at selected intervals, during recording, positioning breaks or gaps are incorporated in at least one of the tracks recorded by the moved head pick ups and in the fixed head track. During replay, the tape 10 is arranged to stop whenever a break arrives at the fixed head pick up $x$ does not start up again until the moving head 13, which is arranged to continue moving, has come up to its equivalent break. The tape 10 is then restarted with the device once more in step. The stopping and starting of the tape as aforesaid is controlled by the logic circuit 34. Thus the tape 10 is arranged to wait at periodic intervals until the moving head 13 catches up with it.

Depending on whether, during replay, the moving head 13 moves faster or slower than it ought to, it will arrive at its positioning break before or after the appropriate break arrives at the fixed head. Logic circuitry has therefore to be provided informing the moving head 13 whether to keep on moving in the same direction as previously or whether it has to reverse in order to go back to its break when the tape has stopped. It will be appreciated that in some cases, e.g. in the control of a cutting operation on a machine tool, that it will be essential to ensure that the tape will always lead the moving head in order to eliminate the possibility of over cutting with the machine tool. In other cases, for example when the device is used to control movements of a material handling system it is not essential to ensure that the moving head will never have to reverse its direction of motion to go back to its positioning break. As a result of arranging for the tape to move faster than the pick up head it is possible to have the head continuously moving. This is possible because when the tape stops it must always be so positioned as to require the pick up head to catch up without having to reverse its direction of motion. Hence when the head reaches the positioning break the tape will start and the head can continue to move.

As an alternative there is provided a normally engaged electro-magnetic clutch 36 which is connected to the logic circuit box 34. Clutch 36 is disengageable to facilitate tape rewind. After each positioning stop and when the moving head 13 has reached its positioning break, the solenoid 37 is actuated so as to rotate a ratchet wheel 38 and thus the shaft of motor 29 sharply by a certain amount. This causes the tape to be indexed forwards, i.e. accelerated above its normal speed, thus creating a deliberate error so that the movable head 13 is effectively behind its programme schedule. Naturally the deliberate error must be greater than the error accumulated by the system in the time interval between any two positioning breaks. Thus when the moving head 13 and the tape 10 are moving in opposite directions, the fixed head will always experience a positioning break first and stop the tape so that the moving head 13 will continue to move with its current motion until it reaches its own positioning break.

If desired the tape can be run continuously at a higher speed than that at which the programme was recorded. In this case, when it is required to carry out the programme at the same speed as the tape was recorded a D.C. generator 44 (hereinafter referred to) would be adjusted to compensate for the higher speed of tape movement. This will ensure that the moving head will always lag the positioning breaks.

However, when the moving head 13 is moving in the same direction as the tape 10 the forward indexing of the latter causes the next consecutive positioning break to overtake the moving head 13 so that the latter is positioned to read out the next part of the programme prematurely. This clearly is undesirable and so the logic circuit 34 ensures that as soon as the moving head 13 is overtaken by its break it causes the freeze valve actuator 35 to lock the valve 22, so that the moving head 13 continues with its current motion until it reaches its break again. This is important, for example, when the movable member $s$ is adapted for cutting a work piece on a lathe so that the correct amount of cut is carried out and there is no "over-shoot." As soon as the moving head 13 reaches its break, the logic circuit 34 causes the tape to re-start, and the programme continues until the next positioning break.

If one of the aforementioned series of positioning breaks is recorded at the moment when the movable member $s$ must stop at a particular position then, during replay, the accuracy with which this position is reproduced depends only on the accuracy with which the fixed head can cause the tape to stop and the moving head can position itself over its positioning breaks.

The positioning breaks can be incorporated in the programme during or after recording the latter.

When a dwell period is incorporated in a programme by adjusting the frequency ratio accordingly, and a positioning break is incorporated during the dwell period and the logic circuit 34 should be programmed to ensure that the moving head 13 can move to its positioning break after the dwell period so as to allow the tape to restort.

On the same tape or on a synchronously running tape another pair of tracks can be recorded for the purpose of generally accelerating or decelerating the action of the whole device. These tracks are sensed by a further pair of pick ups $w$ mounted on the moving head 13, the outputs of which are fed to frequency voltage converters 39 from which two D.C. voltages are fed to a comparator 40, the output of which is fed to an amplifier 41 and to the pump 23 of the servo valve 22 to alter the pressure generated thereby and thus alter the speed of movement of the piston 24. Clearly these tracks can be recorded on the tape after the tracks controlling the working cycle have been recorded and tested so that the cycle as a whole or in part can be speeded up or slowed down. Re-recording or cancellation of all or part of this other pair of tracks can also be effected subsequently.

A call for the overall increase or decrease in tape speed when it is desired to operate the programme at a speed other than the pre-recorded speed is controlled by the tracks associated with the pick up head $w$, $w$ and a signal is passed through the comparator 40 to the amplifier 41 to pump 23 to ensure that the output pressure from the valve 22 is increased or decreased in proportion to the signal. Additionally, the amplifier 41 is connected to the speed control amplifier 31 to alter the speed of the motor 29 and thus alter the tape wind up speed.

To compensate for changes in, for example, the viscosity of the hydraulic fluid in the system due to changes in temperature, a further track of fixed frequency can be recorded on the tape and be sensed by a further pick up $z$ mounted in the moving head 13. The signal from pick up $z$, during replay, is fed to a frequency-to-voltage converter 42 which thus generates a D.C. voltage which is fed to a comparator 43 and is compared with a reference voltage supplied by a D.C. generator 44. Any discrepancy arising between the two is fed to the pump 23 to alter the pressure in the valve 22 and thus re-establish the desired rate of movement of the piston 24 of the cylinder 15. Thus if, for example, the viscosity changes gradually during a work cycle, the valve output is automatically adjusted accordingly.

The reference voltage generator 44 is also connected to the amplifier 41 so that the reference voltage keeps in step with any programmed changes in the general speed of the work cycle.

Figure 4:
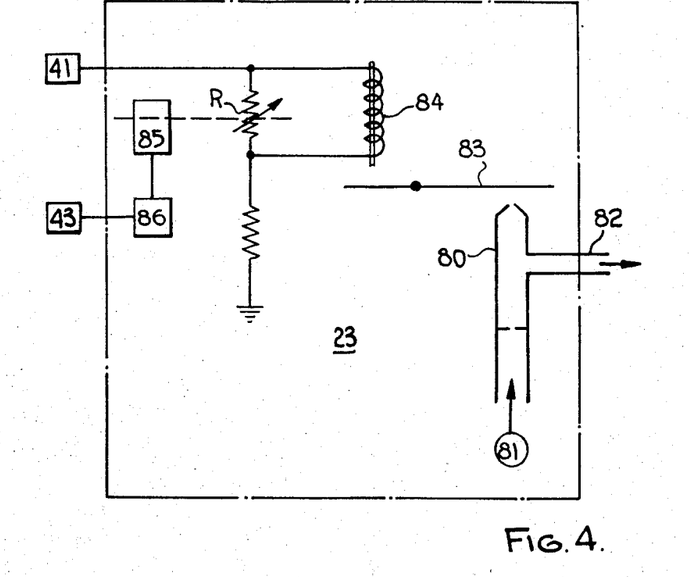
FIG. 4 is a more detailed block diagram of one component of the circuit of FIG. 3.

The pump 23 as shown in FIG. 4 comprises a hydraulic transducer 80 supplied from a source of fluid 81 and having an output 82 to the servo valve 22. The transducer 80 is controlled by an arm 83 operated by a solenoid 84 which is controlled by a variable resistor R. The latter is operated by an electric motor 85 connected to a control amplifier and relay 86. Inputs to the pump are from amplifier 41 (controlling the speeding-up or slowing-down of the programme) and comparator 43 (controlling the gradual alteration of movement due to condition changes of, for example, the viscosity of the hydraulic fluid). As mentioned previously, the output of comparator 43 is under the control of the condition of amplifier 41.

Rapid re-wind of the tape 10 to any desired position in the working cycle can be effected by reversing the action of the tape drive motor 29. When a re-wind button 45 is depressed, the logic circuit 34 is programmed to cause the motor 29 to reverse at high speed and while the fixed pick up head during re-wind senses a certain number of positioning breaks, the movable head 13 is caused to move if necessary in one direction or the other so that it stops at the appropriate break. Thus the fixed and movable pick up heads will be re-set relative to each other for re-starting the tape.

The pump just described may be used in a control system which is of simpler form than that just described and in which there is provided a tape having a programme track and a comparator track, associated with the comparator track is a fixed pick up head and associated with the programme track is a moving head. For use in relatively simple programmes it is possible during recording of the programme simultaneously to put into the comparator track and programme track a series of indicia in the form of spikes which, when the programme is being carried out will be sensed by the moving and fixed heads so as to provide information to the logic circuit as to whether the programme being carried out is lagging or leading the programme on the tape track. If the programme being carried out is lagging then the signal from the comparator 43 will, after having been amplified by the control amplifier 86, energise the resistor control motor 85 to cause the servo valve unit to feed more fluid to the cylinder 15 and hence speed up the programme being carried out in order that it will eventually be in synchronism with the programme on the tape. Alternatively if the programme is being carried out too quickly the output from the servo valve unit will be reduced to reduce the speed at which the programme is being carried out.

Figure 5:
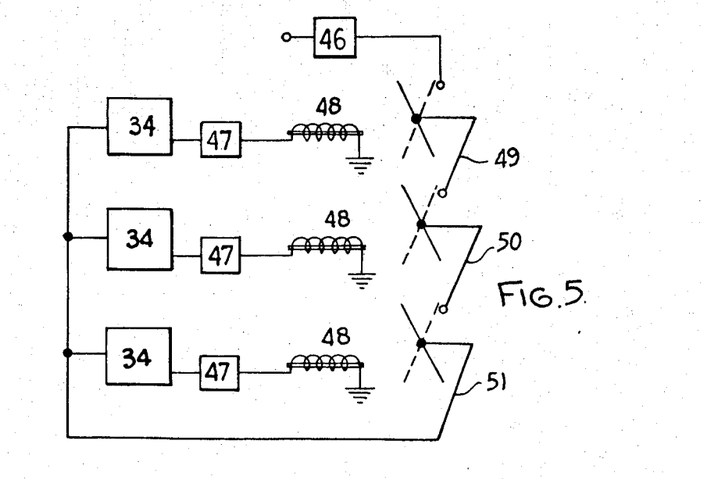
FIG. 5 is a block diagram of one component of the circuit of FIG. 3, duplicated twice and adapted for use in a particular manner.

Two or three dimensional movement of a movable member $s$ can be effected by providing two or three different programmed tapes all having a fixed and movable head as described previously. In order to synchronise the movement of the tapes with each other and with their working mechanism, each should have positioning breaks which are recorded simultaneously and they are arranged such that at each such break the tape or tapes which stop first cannot be re-started until the movable pick up head of the last tape to stop reaches its break. The logic circuits 34 of the systems are connected together as shown in FIG. 5. A source of voltage 46 is provided and each logic circuit 34 is connected via a relay 47 to a solenoid switch 48. When each tape stops at its positioning break the associated switch 48 is actuated so that when all the switches are actuated a circuit from the voltage source 46 to the logic circuits 34, via conductors 49, 50 and 51 is completed. All tapes are then indexed forwards and started simultaneously. Thus the tapes keep in step with each other. As an alternative method of synchronisation, the logic circuits 34 can be interconnected so that they are arranged to count the number of breaks which pass in each tape. Should one tape slow down, relative to one selected leading tape in the system, action is taken to speed it up by increasing the pressure of the fluid fed to its associated servo valve.

Alternatively a single tape with tracks and pick up heads for each dimensional movement to be carried out can be provided, in this case it is only necessary to provide one stationary head and to ensure that the tape cannot re-start after reaching a positioning break until the last movable pickup head has reached its break. The problem of synchronising tapes is thus obviated.

Figure 6:
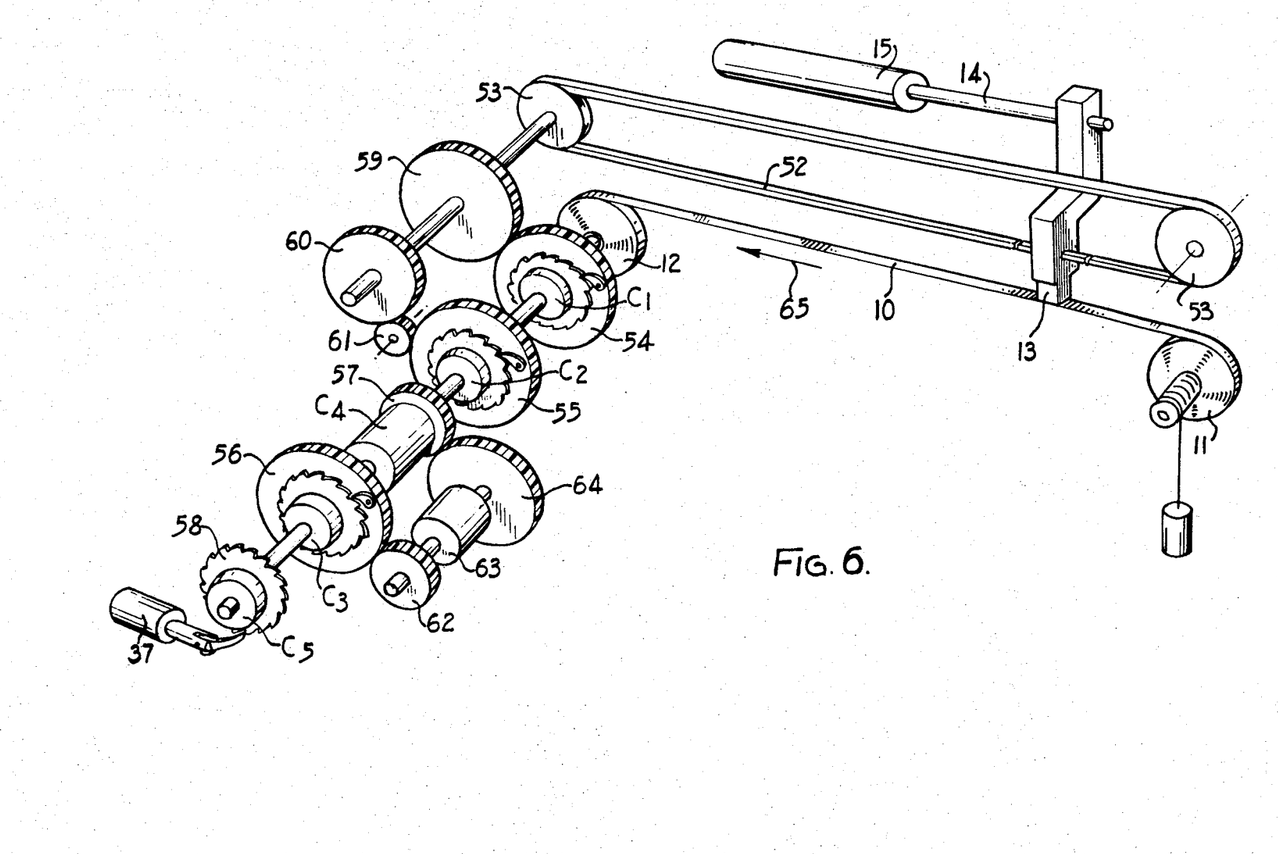
FIG. 6 is a schematic perspective view of a modified tape drive means.
Figure 7:
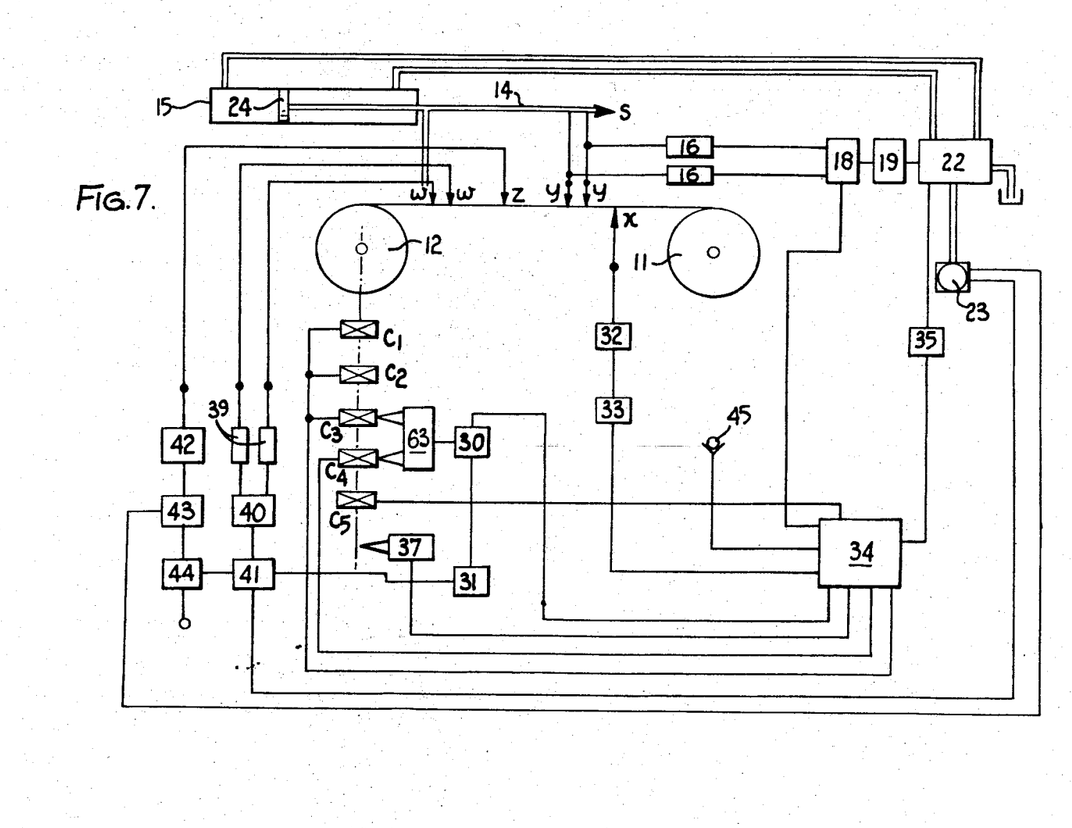
FIG. 7 is a block circuit diagram similar to FIG. 3 but including the tape drive means shown in FIG. 6.

The system described so far has the disadvantage that the tape must be driven at a speed faster than the maximum speed at which the moving head moves such that, when the head moves in the same direction as the tape, the tape always moves faster than the moving head. For long cycles of work, this can necessitate very large lengths of tape. A number of ways of economising on tape are possible and one such way is shown in FIGS. 6 and 7. The movement of the moving head 13 can be arranged to control the movement of the tape 10. The head 13 is attached to a continuous belt 52 which wraps pulleys 53. The shaft of the take-up spool 12 carries a ratchet and gear 54 and associated clutch C1, ratchet and gear 55 and clutch C2, ratchet and gear 56 and clutch C3, gear 57 and clutch C4, and ratchet 58 and clutch C5. The clutches C1 to C5 are of the electro-magnetic type. The shaft of one of the belt pulleys 53 carries a gear 59 which meshes with gear 54, and a gear 60 which meshes, via an intermediate gear 61, with gear 55. Gear 56 meshes with a gear 62 fixed to the shaft of an override motor 63, which shaft also carries a gear 64 which meshes with gear 57.

The gears 54 and 55 are so arranged that upon movement of the moving head 13 in either direction, the tape is always advanced in the direction of the arrow 65 and there is a fixed relationship between the speed of the moving head 13 and the driven speed of the tape 10. The relationship can be different for the two different directions of movement of the head.

The override motor 63 is provided to drive the tape 10 at a certain minimum speed during periods when the head 13 is stationary or moving at a speed so slow that no signal could otherwise be detected.

As can be seen from FIG. 7, the clutches C1, C2 and C3 are connected by a common lead to the logic circuit box 34. Therefore, when the fixed head pick up $x$ senses a positioning break, the clutches C1 to C3 are disengaged so that the tape 10 stops and the head 13 can continue to move until it reaches its positioning break, whereupon clutches C1 to C3 are engaged once again, because clutch C5 is engaged and solenoid 37 is energised the ratchet 58 is rotated sharply by a certain amount to index the tape forwards as described previously, and the programme continues.

Another way of varying the speed of the tape such that its speed is at all instances slightly faster than the speed of the moving head is to provide an extra pair of tracks thereon with appropriate pick up heads acting at all times in the same manner as the pick up heads $w, w$ of FIG. 2.

For rewinding the tape 10, the rewind button 45 depressed, the logic circuit 34 then causes clutches C1 to C3 and C5 to be disengaged, and C4 which is also connected to the logic circuit 34 is engaged. Thus drive motor 63 is caused to drive the shaft of spool 12 through clutch C4, at high speed to rewind the tape 10 onto spool 11.

In a modification of the arrangement disclosed in relation to FIGS. 6 and 7 it is possible to dispense with the clutches C3, C4 and C5 and their associated ratchet mechanisms and also the gear 62. It is also possible to place the head 13 adjacent to the tape 10 without connecting it to the ram 14 and thus the head 13 can be either fixed or movable. This possibility exists by virtue of the fact that the tape can be driven by the ram 14 for so long as the latter is moving and thus moving the belt 52. When the tape programme indicates that the ram should stop, dwell or reverse there will be, at least momentarily, no drive for the tape and thus unless a temporarily energised drive means to induce relative motion between the head and the tape independent of the ram 14 is provided the programme could not be continued. To enable the programme to continue the head could be caused, for example by energisation of a solenoid, to jump returnably forwards against the tape movement to sense whether a reversal or dwell is required. If a dwell is required then a signal is fed to the override motor 63 which starts to rotate to cause it to take over the drive of the tape spools until the head senses the programme indication to restart, or reverse at which time the motor stops and the ram movement again takes over (via the belt 52 and pulley 53) drive of the tape and hence the programme continues. Alternatively, if no dwells are required the motor can be dispensed with, and so can the indexing forward of the head.

As two examples of arrangements alternative to that wherein the electrical output to the coil 20 is determined by a ratio of frequencies, two waveforms having phase displacement can be compared or comparison can be made between two waveforms having amplitude modulation.

Figure 8:
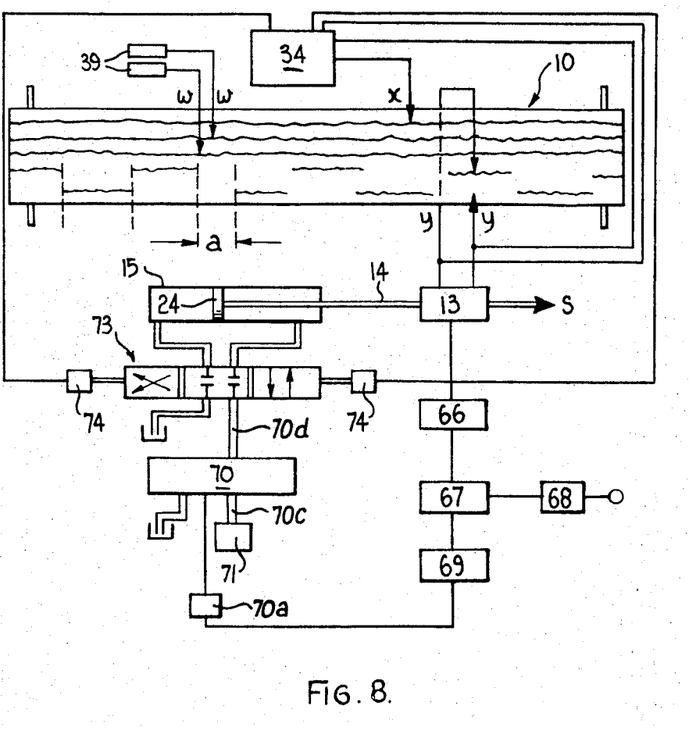
FIG. 8 is a schematic diagram of a second embodiment of the invention.
Figure 8A:
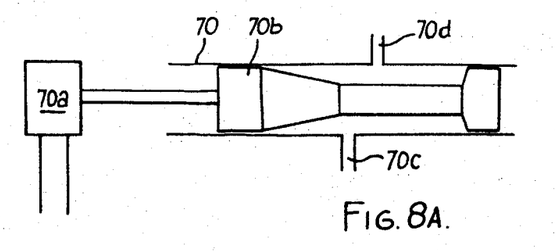
FIG. 8a is a schematic illustration of a part of the device illustrated in FIG. 8.
Figure 9:
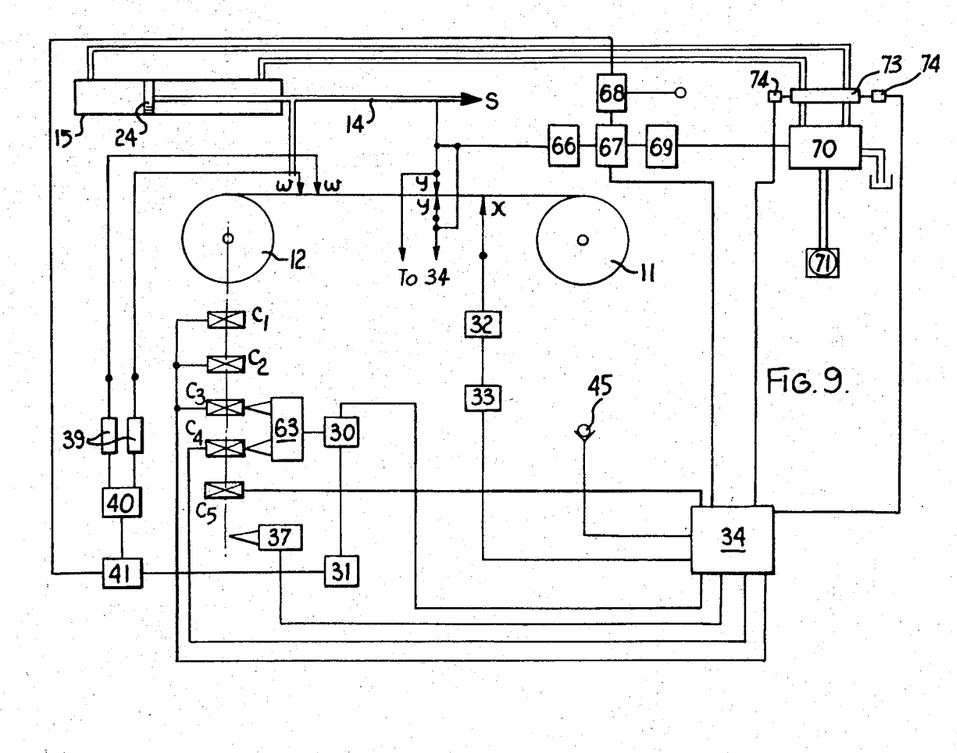
FIG. 9 is a block circuit diagram of the embodiment of FIG. 8 and including the tape drive means of FIG. 6.

Alternatively, as can be seen from FIGS. 8 and 9 a feedback-type system can be used. In this case a continuous reference waveform is again recorded on the tape 10 and is sensed by the pick up $x$ of a fixed head. Two other waveforms are recorded which appear alternately dependent upon in which direction the movable member $s$ is desired to travel, and these waveforms are sensed by two aligned pick ups $y$ in the moving head 13. The signal from the moving head is fed to a frequency-to-voltage converter 66, and a D.C. output voltage therefrom is fed to a comparator 67 to which is fed a D.C. reference voltage from a generator 68. The resultant output signal, if any, is fed to a servo amplifier 69 and this amplifier is, for example connected, as shown in FIG. 8a to a reversing motor 70a which is connected to the spool 70b of a flow control valve 70. When there is no signal from the amplifier 69 the spool 70b is in the position shown and fluid can flow through the valve from the input 70c to the output 70d and thus to a four way valve 73 (yet to be described). A signal to the motor 70a from amplifier 69 in one sense will cause the spool 60b to move to throttle the flow through the valve and a signal in the opposite sense will cause the motor to reverse and move the spool 70b to allow a greater flow of fluid through the valve 70. The flow control valve 70 is fed by a pump 71. The four-way valve 73 is controlled by two solenoids 74 which themselves are connected to the logic circuit box 34 and are controlled in accordance with whichever track the moving head pick ups $y$ are reading at any instant. The four-way valve 73 operates in a manner such that if the signal from the operative pick up head $y$ is being correctly obeyed by the movable member $s$ there will be no signal through the amplifier 69 and thus the rate of flow of fluid through valve 70 will remain constant. If the moving member is not correctly moving according to the programme there will be a signal through the amplifier 69 and the motor 70a will either throttle or open valve 70 to cause the spool of valve 73 to move in a sense such that more or less fluid will flow to the requisite end of cylinder 15 to correct the movement of movable member $s$. Thus, during replay, the direction of travel of the piston 24 is, in this case, determined by the track being sensed. The speed of travel is controlled by the reference voltage from the generator 68. When there is no difference between this voltage and that obtained from the head 13 via the converter 66, the speed of the moving head is correct. However, when a difference occurs, a signal of one polarity or the other is emitted from the comparator 67 and this signal, in accodance with its magnitude and polarity, is used to speed up or slow down the flow through the flow control valve 70, such that the movable member $s$ is at all times constrained to run at the correct speed.

Once again pick ups $w$ can be provided to permit general speeding up or slowing down of the work cycle as required, and amplifier 41 is in this case connected to the reference voltage generator 68 so that the latter allows the speeding up or slowing down of the system as required.

If desired a single track can be sensed by the moving pick up head and some means provided to cause the movable member to move in the required direction.

In this arrangement, positioning stops can be incorporated in the programme in a similar manner to that described previously and positive stops or dwells can be achieved when both of the alternate waveforms appear simultaneously in front of the movable pick up head 13 or when neither appears (as shown at $a$ in FIG. 8).

If required, either of the types of recorded programme previously described together with their associated pick up heads can be duplicated several times on one tape, the arrangement being such that no stops will take place unless all of the duplicated sets of tracks give null signals. This would avoid any breakdown of the programme due to loss of recording or other interference such as dust on the tape.

With the modified form of tape drive means as shown in FIGS. 6, 7 and 9, wherein the tape 10 and the moving head 13 move in unison, a more accurate system is provided such that the moving head is less likely to get out-of-step with the programme on the tape. Therefore for short-cycle programmes, preferably wherein the overide moto 63 is only used to drive the tape when the moving head is stopped completely, positioning breaks may not be necessary in the programme.

In all of the foregoing description, reference has been made to a tape moving in one direction between two spools. It should be appreciated, however, that this arrangement could be replaced by, for example a cylinder having a programme recorded thereon in a series of consecutive straight axial runs, such that when the moving head reaches the end of the cylinder on each run, the cylinder is arranged to index rotationally so that the heads sense the next run. In this case, the cylinder can be driven in both directions with respect to the heads. Alternatively, the programme could be arranged as a continuous spiral track around the periphery of a cylinder. In this case the movable head would follow the track and also exhibit arcuate movement.

Whilst in the foregoing description reference has been made to the use of separate tracks for the $w$, $x$, $y$ and $z$ pick up heads and as shown in FIG. 2 six tracks have been indicated it is possible to use one track for more than one pick up head.

For example, the tracks for the two $y$ heads can be utilized for use with the $x$ head and one of the $w$ heads, thus making it possible to use a tape having only three tracks thereon, the $z$ head in this case also using one of the tracks of the $y$ heads.

As stated above one the tracks for the two $y$ heads is wavelength modulated and the other is conveniently of constant wavelength.

It follows that the $z$ head must be associated with the wavelength modulated track but the $x$ head can be associated with either track. One of the $w$ heads is associated with the constant wavelength $y$ track and the other has provided a separate track which is wavelength modulated. It will be appreciated that it is necessary to ensure that any stationary head must be located at a position such that it will never interfere with the movement of the movable head, that is it must be outside the range of movement of the movable head.

Although the programme has been referred to as being a waveform programme recorded on magnetic medium, it could be recorded as an optical pattern to be sensed by a photoelectric means. The optical programme can be of waveform type or a varying degree of transparency.

It has been stated that dwells in a work cycle can be effected by arranging for a particular frequency ratio. Dwells can also be effected by causing the system as a whole, at the moment when the moving head stops at a selected point, to cause a further, similar system to be activated such that the latter when it has completed a selected programme interval, causes re-activation of the first system to re-start its programme. In this manner, two or more movable members can be controlled independently or dependently of each other.

Figure 10:
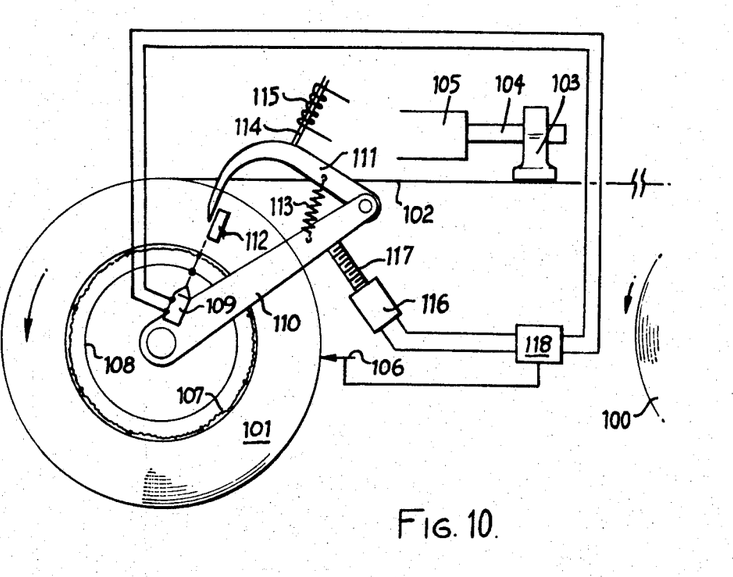
FIG. 10 is a view similar to FIG. 1 but showing a further embodiment of the invention.

As shown in FIG. 10 there is provided a delivery spool 100 spaced from a take up spool 101 (to be described in detail below) and between the two spools there extends a length of tape 102 which is kept taut. A movable pick up head 103 is provided and is attached to the ram 104 of a hydraulic cylinder 105. In addition there is pro- a fixed pick up head 106 adjacent the tape 102 at any convenient position on the periphery of the spool 101.

The spool 101 is provided with a fixed endless strip of magnetic tape onto which two tracks 107 and 108 are recorded. The track 107 has a series of spaced apart spikes which are adapted to be sensed by one pick up of a pick up head 109. The track 108 has a single spike thereon which can be sensed by a second pick up of the pick up head 109.

The pick up head 109 is mounted on an arm 110 which is itself freely pivoted on the axle of the spool 101. At the free end of the arm 110 is pivotally mounted a hook element 111. Mounted on the spool face is a stop 112 into the path of movement of which the hook element 111 is normally spring loaded by spring 113. Attached to the hook element 111 is a link 114 which is arranged to be moved by a solenoid 115.

Adjacent the arm 110 is mounted a motor 116 which drives a screw 117 the end of which passes through a captive nut on the arm 110. The motor is in circuit with a comparator 118 from which a connection is made to the fixed head 106 and also to the pick up head 109.

To record a programme on the tape 102 a pair of $y$, $y$ tracks are produced in the manner described in relation to FIGS. 1 and 2. At the same time the pick up head 109 serves, each time a spike of track 107 passes it, to cause a spike to be produced on one of the $y$, $y$ tracks.

Each time the single spike on the track 108 passes the pick up head 109 it causes a positioning break to be made in one of the $y$, $y$ tracks on the tape. The single spike on track 108 is positioned such that it passes the pick up head 109 at the same time as the hook 111 would be contacted by the stop 112. During recording of the programme the hook is permanently held out of the path of movement of the stop 112.

If desired the spikes on the tape 102 which correspond to the spikes on track 107 can be recorded on a track separate from the $y$, $y$ tracks.

When the device is in use and a programme is being carried out the comparator will receive signals from the fixed head 106 and the head 109 as spikes on the tape 102 and the track 107 pass their respective heads.

Assuming that a spike on the tape 102 reaches the head 106 before the corresponding spike on track 107 reaches the head 109 the signal sent from the comparator 118 to the motor 116 will energise the motor in a sense such that the arm 110 will move in a clockwise direction so that the stop 112 will contact the hook 111 in such a position that the positioning break on the tape 102 will be in the exact position it was recorded at.

Assuming that the spike on the track 107 reaches the pick up head 109 before the corresponding spike on the tape reaches the head 106 the comparator will signal the motor 116 to operate in the reverse sense.

If the corresponding spikes reach their heads simultaneously no signal is emitted from the comparator.

Each time the stop 112 contacts the hook 111 the motor 116 will stop as in fact will the tape 102. This will allow the moving head 103 to become located over the appropriate positioning break on the tape 102 so as if necessary a correction for the rate of movement of the ram 104 can be made. As soon as the moving head 103 reaches the appropriate positioning break the solenoid 115 is energised to move the hook 111 to allow the spool to recommence its roation so that the next operation of the programme can be initiated. Motor 116 can now, when necessary be caused to operate to adjust the position of the arm 110 as required.

If desired the arrangement shown in FIG. 1 may be retained and a capstan element would be provided between the two spools the capstan having a form identical to the spool 101 just described.

When a system using a capstan is employed the tape may be cogged (i.e. it may be of the same form as a cinematograph film). In this case there would only be provided a single track similar to the track 108 and the pickup head 109 would be fixed in position. A stop 112 and hook element 111 would be provided and clearly the tape must always move correctly due to the interengagement of teeth on the capstan and perforations in the tape. Thus it follows that the single spike on the track will always reach the pick up head at the requisite time and the tape will be stopped to enable the movable pick up head to reach its positioning break before a further programme operation can be commenced.

I claim:

1. A method of controlling a machine having at least one movable member to be moved in accordance with a predetermined program, including the steps of providing a surface adapted to have recorded thereon program information for initiating motion of said surface, a pick-up head adjacent said surface sensing said information, causing motion of said surface relative to said pick-up head during a program cycle, causing movement of said movable member in accordance with said program, and moving said pick-up head in accordance with said movement of the movable member.

2. Control means for a machine having at least one movable member adapted to be moved in accordance with a predetermined program comprising a surface adapted to have program information recorded thereon, means for initiating motion of said surface, a pick-up head adapted to sense said information, means for causing motion of said surface relative to said head during a program cycle, means for causing movement of said movable member in accordance with said program, and said pick-up head being movable in accordance with said movement of the movable member.

3. A method of controlling a machine as set forth in claim 1 having at least one movable member to be moved in accordance with a predetermined program, including the steps of providing a surface adapted to have recorded thereon program information, arranging a pick-up head adjacent said head to sense said information, causing, during a program cycle motion of said surface relative to said pick-up head, causing movement of said movable member in response to a signal emitted by said pick-up head, moving said pick-up head in accordance with said movement of the movable member, and causing said surface and said pick-up head to move concurrently.

4. Control means as set forth in claim 2 for a machine having at least one movable member to be moved in accordance with a predetermined program, including a surface adapted to have recorded thereon program information, for example of magnetic or optical waveform type, a pick-up head adapted to sense said information, means for causing, during a program cycle, motion of said surface relative to said pick-up head, means for causing movement, in accordance with said program, of said movable member in response to a signal emitted by said pick-up head, said pick-up head being movable in accordance with said movement of the movable member said surface and said pick-up head being movable concurrently.

5. Control means as set forth in claim 2, in which said surface is adapted to have recorded thereon, two waveforms said waveforms being recorded along parallel tracks, one of said waveforms being wavelength modulated, both of said waveforms being, in use, sensed by said pick-up head which thus feeds two signals to means adapted to emit a single signal proportional to the ratio of the frequencies formed from the waveforms, said single signal being fed to a servo valve which accordingly controls the movement of said movable member in accordance with said recorded program.

6. Control means as set forth in claim 5 in which said signal emitting means comprises two frequency-to-voltage converters, connected to a comparator, said servo valve being arranged to control the direction and speed of movement of the piston of a hydraulic cylinder whose ram is adapted to cause movement of said movable member.

7. Control means as set forth in claim 2, in which said surface comprises a tape arranged to be transferred from a delivery spool to a take-up spool, said spools being spaced-apart, thus having a length of substantially taut tape between them, said pick-up head being arranged to move along in contact with the part of the tape between the spools and to sense said information, said tape being driven at a speed greater than the maximum speed of the pick-up head when the latter is moving in the same direction as the tape.

8. Control means as set forth in claim 6, in which said servo valve controls the speed and direction of the flow of hydraulic fluid from a pump to one or other side of said hydraulic cylinder.

9. Control means as set forth in claim 2, in which said surface is arranged to be moved by movement of said pick-up head, such that the surface is always driven in one direction irrespective of the direction of movement of the head, and the speed of movement of the surface is dependent upon that of the head, such that said surface is always driven at a speed greater than the maximum speed of the pick-up head when the latter is moving in the same direction as the surface.

10. Control means as set forth in claim 9 in which said surface is driven through a system of gears, ratchets and clutches, said system being drivingly connected to said pick-up head.

11. Control means as set forth in claim 9, in which an override motor is provided and adapted to ensure continued movement of said surface whenever the pick-up head ceases to move or moves so slowly that the program on the surface cannot be detected by the head.

12. Control means as set forth in claim 2, in which said surface is adapted to have recorded thereon a reference waveform, there being provided a fixed pick-up head adapted to sense said reference waveform, means being provided such that said reference waveform and the recorded program sensed by the movable pick-up head can be arranged to include positioning breaks at selected intervals in said program, further means being provided and arranged to cause said surface to stop moving when said fixed pick-up head senses a positioning break, and to cause said movable head to move until it in turn reaches its positioning break whereupon the surface is re-started.

13. Control means as set forth in claim 11 in which means are provided for causing said surface to be indexed forwards by a certain amount after each positioning break thus creating a deliberate error and causing said moving head to be effectively behind its program schedule, further means being provided for causing said moving head to continue its current motion when the surface has stopped and until the moving head positions itself correctly over the appropriate positioning break.

14. Control means as set forth in claim 2 in which said surface is adapted to have recorded thereon information such that some or all of the recorded program can be generally speeded-up or slowed-down, pick-up means being provided to sense said information and further means being provided to cause the movement of said movable member generally to be speeded-up or sloweddown in accordance with a signal emitted by said pick-up means.

15. Control means as set forth in claim 5, in which said surface is adapted to have recorded thereon a further waveform of constant frequency, there being provided a further pick-up arranged to sense said waveform, and means for causing the signal emitted from said pick-up to be compared with a reference signal, such that any discrepancy between said signals is arranged to adjust the effect of said servo valve, thus compensating for any gradual changes in working conditions during a program cycle.

16. Control means as set forth in claim 2, in which said surface is adapted to have recorded thereon a waveform said waveform being sensed by said movable pick-up head, which thus feeds a signal to means including a comparator to which is also fed a reference signal, any discrepancy between the two signals being fed to, for example, a servo valve to control the movement of said movable member in accordance with said recorded program.

17. Control means as set forth in claim 16, in which the signal from said movable pick-up head is fed to a frequency-to-voltage converter, the output from which is fed to said comparator, the speed of movement of said movable member being determined by said reefrence signal.

18. Control means as set forth in claim 16, in which said tape is adapted to have recorded thereon, along parallel tracks, two such waveforms which appear alternately, one of said waveforms being sensed by said movable pick-up head, the direction of movement of said movable member being determined according to whichever of the waveforms appears before said pick-up head.

19. Control means as set forth in claim 18, in which said movable member ceases to move when there is no waveform appearing on either of said tracks.

20. Control means as set forth in claim 18 in which said movable member ceases to move when a waveform appears on both tracks simultaneously.

21. Control means as set forth in claim 16, in which said surface is adapted to have recorded thereon a reference waveform there being provided a fixed pickup head adapted to sense, said reference waveform, positioning breaks being provided in said program, means being provided to cause said surface to stop moving when said fixed head senses a positioning break and to allow said movable head to continue its current motion until it positions itself correctly over the appropriate positioning break.

22. Control means as set forth in claim 12 associated with one or more other similar control means, such that said movable member can be moved simultaneously in two or more dimensions, means being provided to ensure that said control means keep in step with each other during a program cycle.

23. Control means as set forth in claim 22 in which positioning breaks in the program of each control means are compared with those of the other control means.

24. Control means as set forth in claim 23, in which said comparison is effected by counting the number of positioning breaks which pass a point of each control means such that should one control means slow down relative to one selected leading control means in the system, action is taken to speed it up to correct the discrepancy.

25. Control means as set forth in claim 23, in which said comparison is effected by stopping the moving heads of the independent control means when these have correctly positioned themselves over their respective positioning breaks and restarting the stopped control means only when the last independent control means has reached its correct position over its positioning break.

26. Control means as set forth in claim 2 in which during recording of a predetermined program on said surface there is provided a comparator track, said program and said comparator tracks being povided with a series of indicia therein, there being a fixed head arranged to sense signals from said comparator track and a movable head arranged to sense said program information and said indicia, a comparator being provided to receive signals initiated by said indicia passing said heads from said moving and said fixed heads to enable the program being carried out by said moving member to be accelerated or decelerated.

27. Control means as set forth in claim 2 in which a series of programs are recorded on a single surface, a head for each program being provided adjacent said surface, a logic circuit for each head, switch means being provided for each logic circuit whereby when said surface is stopped by a positioning break common to all of said programs being reached the switch means are sequentially operated as each moving head reaches its positioning break, the surface being restarter when the last moving head has reached its positioning break.

28. Control means as set forth in claim 2 including a pick-up head adjacent said surface, a movable member connected to a surface drive means in the form of a pair of gears, an axle carrying meshing gears associated with said pair of gears and adapted to actuate ratchet means, clutches associated with said ratchet means and an override motor associated with a gear wheel mounted on said axle whereby during the carrying out of a program the surface is driven through the drive means until a positioning stop is reached at which time the surface is adapted to be moved by the override motor until the pick-up head again passes over the program track on the surface.

29. Control means as set forth in claim 2 in which said surface is adapted to have recorded thereon a reference waveform and a pair of wavelength modulated waveforms, there being a series of pick-up heads associated with the said waveforms for controlling different functions of the program.

30. Control means for a machine having at least one movable member capable of being moved in accordance with a predetermined program comprising a surface adapted to have program information recorded thereon, means for initiating motion of said surface, a spool like element around which said surface may pass, a track on said element comprising spikes adapted to be sensed by a pick-up head, a movable pick-up head adapted to be moved in accordance with said predetermined program to move said movable member, comparator means associated with said pick-up head and said movable pick-up head, a drive means associated with said comparator and adapted to control the position of a means co-operating with a stop means on said spool like element whereby sensing of the spikes in said predetermined program information and on said track on said spool like element serves to move said means relative to said stop to ensure that positioning breaks in said program information are correctly positioned when said stop contacts said means.

31. Control means as set forth in claim 30 in which said spool like element is a capstan.

References Cited

UNITED STATES PATENTS

| | | | |
|---|---|---|---|
| 3,090,896 | 5/1963 | Bowden et al. | 318—567 |
| 2,882,864 | 4/1959 | Booth et al. | 91—37 |
| 3,282,049 | 11/1966 | Benton | 91—37 |
| 3,202,895 | 8/1965 | Arp et al. | 318—603 |
| 3,417,663 | 12/1968 | Beck et al. | 91—39 |
| 3,676,651 | 7/1972 | McDaniel | 318—569 |

ALAN COHAN, Primary Examiner

A. M. ZUPCIC, Assistant Examiner

U.S. Cl. X.R.

91—35; 318—164, 567, 568